US009762078B2

(12) United States Patent
Gale et al.

(10) Patent No.: US 9,762,078 B2
(45) Date of Patent: Sep. 12, 2017

(54) ELECTRIC VEHICLE CHARGING SYSTEM ADAPTOR

(75) Inventors: Allan Roy Gale, Livonia, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1322 days.

(21) Appl. No.: 13/357,667

(22) Filed: Jan. 25, 2012

(65) Prior Publication Data

US 2013/0187600 A1 Jul. 25, 2013

(51) Int. Cl.
*H02J 7/00* (2006.01)
*H02J 7/02* (2016.01)
*B60L 11/18* (2006.01)

(52) U.S. Cl.
CPC ............. *H02J 7/02* (2013.01); *B60L 11/1818* (2013.01); *B60L 11/1846* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............................ H02J 7/025; Y02T 10/7241
USPC .................................................. 320/109, 111
See application file for complete search history.

(56) References Cited

U.S. PATENT DOCUMENTS

| | | | |
|---|---|---|---|
| 4,109,193 A | 8/1978 | Schultheis | |
| 5,369,352 A | 11/1994 | Toepfer et al. | |
| 7,999,506 B1 * | 8/2011 | Hollar et al. | 320/104 |
| 8,311,690 B2 * | 11/2012 | Tanaka | 701/22 |
| 8,378,628 B2 * | 2/2013 | Ichikawa et al. | 320/109 |
| 8,568,155 B2 * | 10/2013 | Sebald et al. | 439/304 |
| 2004/0169489 A1 * | 9/2004 | Hobbs | 320/104 |
| 2008/0231230 A1 * | 9/2008 | Gale et al. | 320/109 |
| 2009/0082916 A1 * | 3/2009 | Tanaka | 701/22 |
| 2010/0079105 A1 * | 4/2010 | Iwanaga et al. | 320/109 |
| 2011/0169447 A1 * | 7/2011 | Brown et al. | 320/109 |
| 2011/0300753 A1 * | 12/2011 | Ichikawa et al. | 439/620.21 |
| 2011/0320056 A1 * | 12/2011 | Brown et al. | 700/295 |
| 2013/0201641 A1 * | 8/2013 | Soden et al. | 361/752 |

(Continued)

FOREIGN PATENT DOCUMENTS

| | | |
|---|---|---|
| JP | 2010263665 A | 11/2010 |
| WO | 0137388 A2 | 5/2001 |

OTHER PUBLICATIONS

TucsonEV.com J1772 Plugs, Inlets Adapter Boxes and Compatible EVSE's, J1772 Adapter, J1772 Adapter Box, http://tucsonev.com/, Nov. 17, 2011.

(Continued)

*Primary Examiner* — Robert Grant
(74) *Attorney, Agent, or Firm* — David Kelley; Brooks Kushman P.C.

(57) ABSTRACT

An adaptor is provided for connecting an EV/PHEV charging system to a grounded extension cord that may be plugged into a conventional NEMA receptacle. A proximity detection switch is provided within the adaptor. A pulse width modulated signal is limited by the control logic to limit the current provided to the vehicle charging system so that the current drawn by the system does not exceed the current carrying capacity of the extension cord. The adaptor has a NEMA plug on one side and a J1772 connector receptacle on another side.

12 Claims, 3 Drawing Sheets

(56) References Cited

U.S. PATENT DOCUMENTS

2014/0002024 A1* 1/2014 Ang et al. .................. 320/109
2014/0035527 A1* 2/2014 Hayashigawa et al. ...... 320/109

OTHER PUBLICATIONS

SAE J1772—Wikipedia, the free encyclopedia, http://en.wikipedia.org/wiki/SAE_J1772, Nov. 17, 2011.
SAE International, Surface Vehicle Recommended Practice, J1772 Jan. 2010, Issued: Oct. 1996; Revised: Jan. 2010, Superseding J1772 Nov. 2001.

* cited by examiner

ELECTRIC VEHICLE CHARGING SYSTEM ADAPTOR

TECHNICAL FIELD

This disclosure relates to the field of adaptors for electric vehicle charging systems that facilitate charging the battery by enabling connection to a conventional source of AC power.

BACKGROUND

Batteries store energy to provide power for an Electric Vehicle (EV) or a Plug-in Hybrid Electric Vehicle (PHEV). An electric power supply network is connected to the EV/PHEV to charge the battery. The charging system, in addition to charging the battery, may also operate other electrical systems, provide a ground path and provide for exchanging control information between the supply equipment and the charging system on the EV/PHEV.

The primary method of charging an EV/PHEV is expected to be in accordance with the SAE J1772 under AC Level 2 Charging with a charging system that is required to use a vehicle connection that requires the user to obtain a charge from a fixed charging station. The charging station may have a receptacle that accepts a SAE standard J1772 plug from the electric vehicle charging system that provides high current charging current (ie. 80 amps).

Alternatively, the vehicle may have a J1772 plug with a cord. An EV/PHEV may be charged in accordance with the developing standard SAE J1772 under AC Level One Charging by connecting to a common grounded receptacle with a cord and an electric vehicle supply equipment (EVSE) plug connector. This approach may be used if the vehicle is provided with an on-board charger that is adapted to receive single phase alternating current (AC) from the supply network with a maximum current of either 12 amps for a 15 amp circuit breaker and a NEMA 5-15 receptacle or a maximum current of 16 amps for a 20 amp circuit breaker and a NEMA 5-20R receptacle.

Carrying a cord with a J1772 plug made under the AC Level One Charging standard in the vehicle may be viewed by the vehicle user as being undesirable due to size, bulk, uncleanliness, and weight. It is anticipated that many vehicle users may forgo keeping the alternative charge cord in the vehicle for these reasons. However, there remains a concern that the vehicle user may encounter a condition where a charge is needed and no fixed power station AC power is available.

The J1772 standard includes a control pilot signal that is transmitted through the Electric Vehicle Supply Equipment (EVSE). The control pilot signal is the primary control conductor that is connected to ground through the control circuitry to perform the functions of: verifying the presence of the plug connection; permitting charging; communicating the supply equipment current rating to the EV/PHEV; monitoring the equipment ground, and the like.

The J1772 standard specifies that a fixed charging system includes a proximity sensor that prevents charging if the plug is not fully connected to the charging station or the vehicle receptacle. The vehicle charging system and fixed charging station communicate regarding the status of a mechanical latch connection to the vehicle receptacle as a condition of the vehicle charging system receiving a charge. The mechanical latch and interlock are intended to prevent arcing between the plug and receptacle.

The absence of the pilot signal or proximity sensor signal will prevent the EV/PHEV charging system from receiving a charge if it is attempted to connect the vehicle charging system to a conventional electrical extension cord.

The above problems and other problems relating to providing a charging system adaptor are addressed by the following disclosure as summarized below.

SUMMARY

An adaptor plug is disclosed that includes a J1772 vehicle connector, a standard AC connector that allows connection to a standard extension cord, a circuit that provides a control logic pilot signal. The adaptor may include a control circuit that provides a proximity sensor signal. The adaptor does not include a cord and can be packaged to be compactly stored in the vehicle. The adaptor includes a circuit for limiting current to a level that can be safely connected to a conventional grounded AC receptacle with a standard extension cord to charge the vehicle when the vehicle requires charging in an emergency situation.

The above summary of the disclosure will be better understood in view of the attached drawings and the following detailed description of the illustrated embodiments.

DETAILED DESCRIPTION

The disclosed embodiments are examples that may be embodied in various and alternative forms. The figures are not necessarily to scale and some features may be exaggerated or minimized to show details of particular components. The specific structural and functional details disclosed in this application are not to be interpreted as limiting, but merely as a representative basis for teaching one skilled in the art how to practice the invention.

Figure 1:
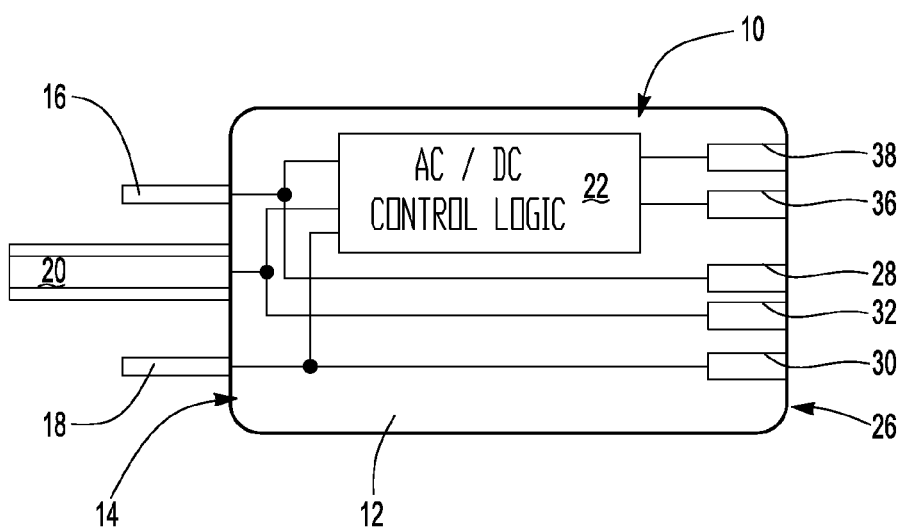
FIG. 1 is a diagrammatic view of one example of an adaptor plug.

Referring to FIG. 1, one embodiment of an adaptor 10 is illustrated that includes a housing 12 that has a NEMA plug side generally indicated by reference numeral 14. An AC line one prong 16, an AC line two prong 18 and a ground prong 20 extend from the NEMA plug side 14 of the housing 12. A circuit comprising an AC/DC control logic circuit 22 is housed within the housing 12 to interface with the vehicle charging circuit, as will be described below in greater detail. A J1772 connector receptacle side 26 is also provided on the housing 12. An AC line one receptacle 28, AC line two receptacle 30 and a ground receptacle 32 are provided on the J1772 connector receptacle side 26 of the housing 12. A control pilot receptacle 36 and proximity detection receptacle 38 are also provided on the J1772 connector receptacle side 26 that are in communication with the AC/DC control logic circuit 22 that is housed within the adaptor 10.

Figure 2:
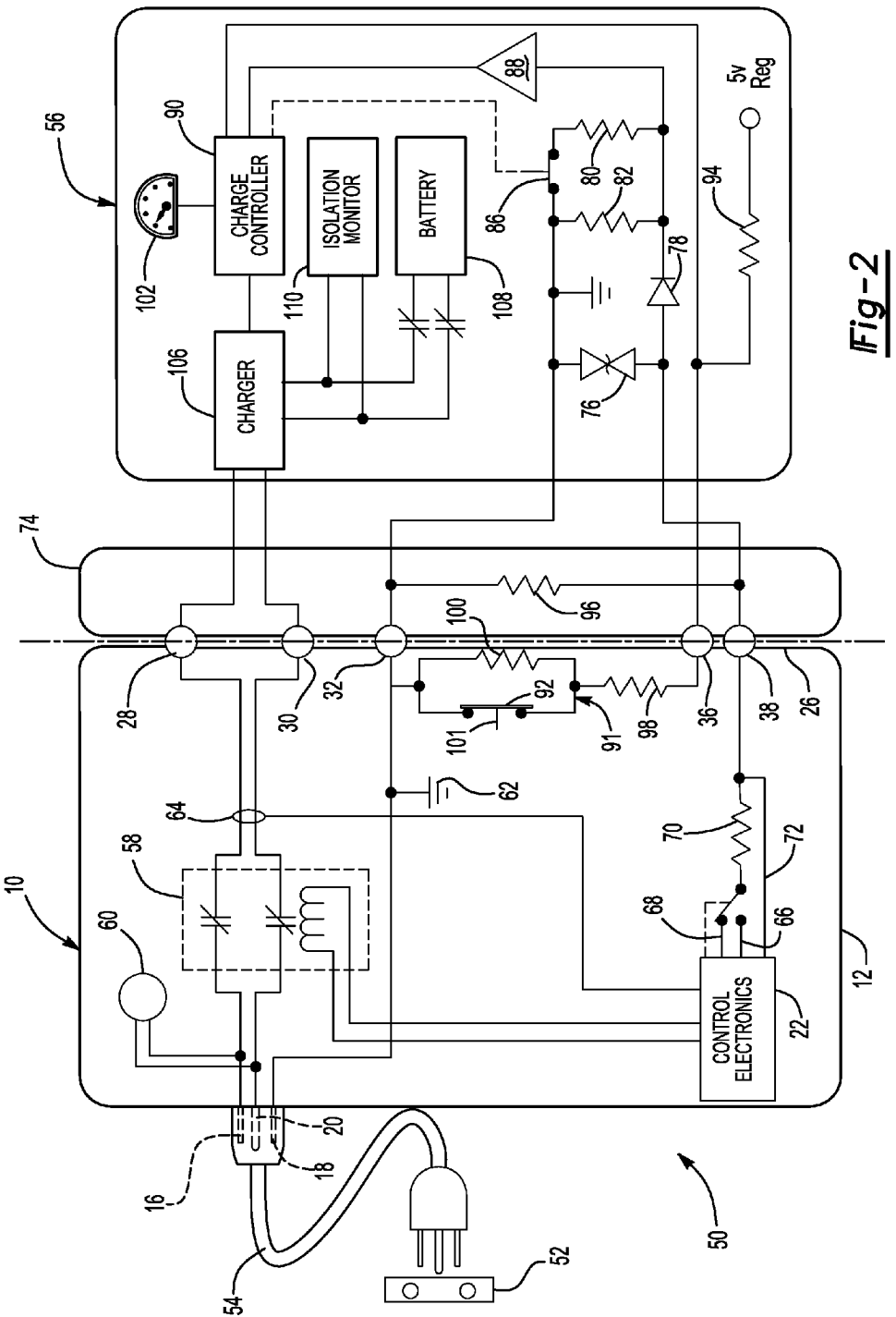
FIG. 2 is a wiring diagram of one example of the adaptor plug.

Referring to FIG. 2, the adaptor 10 is illustrated in a system wiring diagram generally indicated by reference numeral 50. A NEMA receptacle 52 is shown that provides access to the electric supply power grid. A grounded extension cord 54 that may be of the common 14 AWG type is plugged into the receptacle 52 to provide a link between the receptacle 52 and the adaptor 10. AC lines 16, 18 and ground prong 20 of the adaptor 10 are received by the extension cord 54. The adaptor 10 and extension cord 54 together may be referred to as charging link.

A vehicle charging system 56 for an EV/PHEV is generally indicated by reference numeral 56. The adaptor 10 provides a compact connection to the vehicle charging system 56 that permits charging through the extension cord 54.

Contactors 58 are provided within the housing 12. An "AC on" indicator 60 may be provided in the form of an LED light, or the like, to indicate that the adaptor 10 is connected to a source of AC power. The ground prong 20 is connected to an equipment ground 62 that grounds the electronic components and wiring disposed within the adaptor 10. A ground fault interrupt (GFI) 64 may be provided as an input to the AC/DC control logic 22 that interrupts the charging process upon sensing a ground fault.

A +12 volt power supply connection 66 provides power to the control logic 22. A pulse width modulated signal 68 is generated by an oscillator (not shown) within the control logic 22. The oscillator in the adaptor 10 provides a square wave 1 KHz output that is limited to a 20% duty cycle pulse width modulated signal. The pulse width is limited to provide a fixed level of current to the charging system so that the adaptor may be safely used with a 14 AWG standard extension cord 14. The level of current permitted to flow through the charging system may be limited, for example to either 6 amps or 12 amps maximum current, depending upon the branch circuit breaker rating of the receptacle 52. The pulse width modulated signal is provided through the control pilot receptacle 38 to the vehicle charging system 56. The pulse width modulated signal is provided to resistor 70 (R1). Monitoring circuit 72 monitors the output of resistor 70 and is connected to the control logic 22.

The adaptor 10 is connected to a vehicle inlet plug 74 that has pins corresponding to AC line one receptacle 28, AC line two receptacle 30, ground receptacle 32, control pilot receptacle 36 and proximity detection receptacle 38.

A transient voltage suppressor (TVS) 76 is provided between the pulse width modulated signal and ground. A diode 78 is provided to permit the EVSE to determine that an EV/PHEV is connected to the charger and to filter out other potential low impedance loads. Resistor 80 (R2) and Resistor 82 (R3) are linked to opposite sides of closing switch 86 (S2). The EV/PHEV is ready to accept energy from the EVSE when switch 86 is closed and the current profile on the control pilot oscillator is provided to the EVSE. Power from the EVSE at any time may be de-energized by opening the switch 86 to change the signal through the control electronics 22 to open the contactors 58. The current profile is provided through the operational amplifier buffer 88 to the charge controller 90.

A proximity detection circuit 91 includes switch 92 (S3) and a +5V regulated power source through resistor 94 (R4) to an input of the charge controller 90. The proximity detection circuit 91 is connected to ground through resistor 98 (R5). The switch 92 is provided in series with resistor 98 and is connected in parallel to resistor 100 (R7). Resistors 94, 98 and 100 allow for diagnostics of the proximity detection circuit 91. The proximity detection circuit 91 is closed when a mechanical latch 101 is engaged between the adaptor 10 and the vehicle inlet receptacle 74 to provide assurance that the adaptor 10 is fully connected to the vehicle inlet receptacle 74. The proximity detection circuit 91 prevents charging until a complete connection is established. The proximity detection circuit 91 is provided to minimize the likelihood of any electrical arcing during connection or disconnection with the vehicle in the receptacle 74. Switch 92 is mechanically linked to the mechanical latch release actuator 101. Switch 92 is normally closed at all times except when the connector latch release actuator 101 is actuated to decouple the connector from the vehicle inlet. Opening switch 92 triggers the vehicle charge control to provide a controlled shut-off of charge power prior to disconnection.

A charge status indicator 102 is provided to indicate the status of the charge controller 90. The charge controller 90 actuates the charger 106 that allows the battery 108 to receive a charge when the control logic 22 and proximity detection circuit 91 is complete.

The adaptor 10 is compact and may be safely connected to a standard 14 AWG grounded extension cord 54 when an emergency charge is needed by the EV/PHEV. The adaptor 10 includes control electronics within the housing 12 that provide a pulse width modulated control signal that limits the charge controller output to a duty cycle of between 10% and 20% that limits the current provided by the charger 106 to the battery 108 to either 6 amps or 12 amps to assure that the current through the extension cord 54 does not exceed the current carrying capacity of the extension cord 54. The proximity detection circuit 91 including switch 92 and resistors 98 and 100 that are normally provided in the EVSE connector plug are instead incorporated in the adaptor 10.

Figure 3:
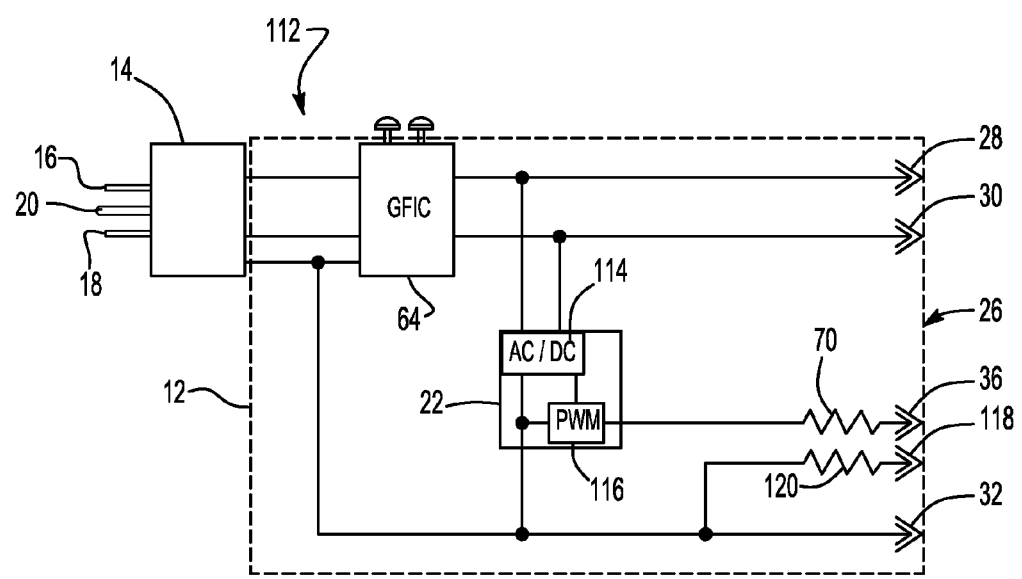
FIG. 3 is a wiring diagram of an alternative embodiment of an adaptor plug.

Referring to FIG. 3, an alternative embodiment of the adapter plug 112 is shown that is simplified in that it does not require the latch actuator 101 or switch 92 of the embodiment of FIG. 2. For brevity, similar components shown in the embodiment of FIG. 3 to those of FIG. 2 are identified by the same reference numerals. The adaptor plug 112 includes AC line one prong 16, AC line two prong 18 and ground plug 20 that extend from a NEMA plug side 14 of the housing 12 indicated by the dotted line in FIG. 3.

A power supply 114 provides power to the control logic 22 and, in particular, provides power to an oscillator 116 that provides a pulse width modulated signal through resistor R1 70 to the control pilot receptacle 36. A ground fault interrupt circuit 64 may be provided within the housing 12 to protect against ground faults, if desired. Instead of the latch actuator 101 and switch 92 of the embodiment of FIG. 2, a jumper is provided between the ground terminal 32 and a jumper terminal 118 that is provided with a resistor 120 matched to the resistance required by the J1772 system across the proximity detection circuit 91.

The adaptor 112 may be used without requiring a mechanical latch interlock. If desired, the AC on indicator 60 that was illustrated in the embodiment of FIG. 2 may, if desired, be eliminated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adaptor for connecting an electric vehicle charging system to an AC power source with a ground through an extension cord, the adaptor comprising:
   a housing;
   a grounded AC male connector directly extending from a first side of the housing and built-in with the housing that is connectable to the extension cord;

a receptacle integral with a second side of the housing that has an AC connector, a ground pin connector, a proximity detection pin connector and a control pilot pin connector; and a control circuit disposed in the housing that generates a predetermined pulse width modulated signal that controls the electric vehicle charging system that limits a current supply level provided to the electric vehicle charging system through the AC connector by communicating with a charge controller of the vehicle charging system through a control pilot pin connector.

2. The adaptor of claim 1 wherein the adaptor provides a resistance value corresponding to the resistance value provided when a proximity switch is indicated to be closed to the vehicle charging system.

3. The adaptor of claim 1 wherein the control circuit provides a signal to the electric vehicle charging system confirming proximity through a proximity detection switch.

4. The adaptor of claim 1 wherein the control circuit provides a plurality of control signals to the electric vehicle charging system through the control pilot pin connector.

5. A charging connection system for connecting an electric vehicle charging system through an extension cord to an AC power source comprising:
an adaptor including:
a housing;
a grounded AC male connector directly extending from a first side of the housing and built-in with the housing that is connectable to the extension cord;
a receptacle integral with a second side of the housing that has AC line pin connectors, a ground pin connector, a proximity detection pin connector and a control pilot pin connector;
a control circuit disposed in the housing that generates a predetermined pulse width modulated signal and defines the maximum level of current available to be drawn by the electric vehicle charging system through the AC line pin connectors by communicating with a charge controller of the vehicle charging system through a control pin connector.

6. The charging connection system of claim 5 further comprising a proximity detection switch disposed in the housing that is actuated when the receptacle is connected to the electric vehicle charging system.

7. The charging connection system of claim 6 wherein the control circuit provides a connection having a predetermined resistance value to the electric vehicle charging system to simulate closure of the proximity detection switch.

8. The adaptor of claim 5 wherein the control circuit provides a plurality of control signals to the electric vehicle charging system through a control pilot pin socket.

9. A charging link for connecting an electric vehicle charging system to an AC power source through an extension cord, the charging link comprising:
an adaptor including:
a housing;
a male AC plug connector directly extending from a first side of the housing and built-in with the housing that is connected to the extension cord;
a receptacle integral with a second side of the housing;
a pulse width modulated signal circuit disposed in the housing that defines the maximum level of current available to the electric vehicle charging system by communicating with a charge controller; and
a proximity detection switch simulator disposed in the housing that indicates that the receptacle is fully connected to the electric vehicle charging system, the proximity detection switch simulator including a jumper terminal and a resistor.

10. The charging link of claim 9 wherein the AC plug connector includes a grounded AC connector.

11. The charging link of claim 9 wherein the receptacle includes AC line pin connectors, a ground pin connector, a proximity detection pin connector and a control pilot pin connector.

12. The charging link of claim 11 wherein the control circuit includes AC line pin connectors that communicate with the charge controller of the vehicle charging system through the control pilot pin connector.

* * * * *